3,338,930
PROCESS FOR THE HYDROLYSIS OF BIS-
METHYLENEDIOXY DERIVATIVES
Francisco Alvarez, John B. Siddall, and Augusto Ruiz, Palo Alto, Calif., assignors to Syntex Corporation, Panama, Panama, a corporation of Panama
No Drawing. Filed Apr. 29, 1966, Ser. No. 546,191
8 Claims. (Cl. 260—397.45)

This is a continuation-in-part of copending application Ser. No. 460,523, filed June 1, 1965, now abandoned.

The present invention relates to a process for the preparation of cyclopentanophenanthrene derivatives.

More particularly, this invention relates to a novel method for the conversion, in good yields and with a minimum of by-product formation, of 17α,20;20,21-bismethylenedioxypregnane and -19-norpregnane derivatives to the corresponding 17α,21-dihydroxy-20-keto steroids.

It has been known for some time that the reaction of 17α,21-dihydroxy-20-keto steroids with formalin or the like, in the presence of a strong acid catalyst, produces 17α,20;20,21-bismethylenedioxy derivatives, thus protecting all the functional groups in the dihydroxyacetone side chain in one step. This grouping is of great value in protecting the steroid during reactions which would normally affect an upprotected dihydroxyacetone side chain. For example, the 17α,20;20,21-bismethylenedioxy grouping is not damaged by submitting the compounds containing it to alkylation, acylation, ketalization, epoxidation, bromination, oxidation, reduction, certain acid-catalyzed rearrangements, and the like.

Up to the present time, however, difficulties encountered in removing this protective grouping following transformations elsewhere in the steroid molecule constitute a serious drawback to its use, particularly in commercial production of steroids.

The reported conditions for the removal of the 17α,20;20,21-bismethylenedioxy grouping call for refluxing for prolonged periods of time in glacial acetic acid or, more commonly, in concentrated aqueous formic acid of up to 90% strength, depending on the particular steroid involved. These conditions almost invariably result in an appreciable amount of by-product formation through esterification of free hydroxyl groups on the nucleus or in the side chain (producing, for example, 21-formates which, if later hydrolyzed, will in part undergo D-homo rearrangement no mater how mild the base used, and/or 11β-formates which can only be hydrolyzed back to the free alcohols under relatively drastic conditions, thus giving rise to an even greater amount of D-homo rearrangement), degradation of the dihydroxyacetone side chain, or destruction or acid-sensitive groups elsewhere in the steroid molecule, or all of these, leading to poor yields of final product and contamination by relatively large amounts of unwanted by-products.

The present information affords a practical and novel solution to these problems by providing an efficient method for the removal of the 17α,20;20,21-bismethylenedioxy protective grouping, hereinafter referred to as "BMD." More specifically, it has been discovered that by treating BMD derivatives of the pregnane series with aqueous solutions of hydrogen halides at relatively low temperatures, the corresponding 17α,21-dihydroxy-20-keto steroids are obtained in high yield and with less by-product contamination then had hitherto generally been possible.

A further advantage of the process of the present invention can be found in the fact that many acid-sensitive groupings elsewhere in the steroid molecule, such as hydroxy groups, certain cyclopropyl groups, and the like, are stable under the conditions employed.

In the context of the present invention, the term "pregnane series" includes non-side chain variants such as the 18-alkyl and 19-nor derivatives as well as pregnanes which have abnormal configuration, e.g., 10α-pregnanes, 9β,10α-pregnanes and the like.

It is to be understood that by reference to aqueous solutions of hydrogen halides is intended conventional hydrohalic acids. Of these hydrohalic acids, hydrofluoric and hydrochloric are particularly preferred.

In the practice of the present invention, the BMD derivative is added to aqueous hydrohalic acid, containing at least 20% by weight of hydrogen halide (based on the total weight of the solution). While this aqueous solution may contain up to 90% by weight of the hydrogen halide, concentrations in the area of about 35% to about 55% are generally satisfactory. Moreover, in some instances, as with hydrochloric acid, the maximum concentration is limited by the solubility of the hydrogen halide in water. While the solubility can be increased by increasing the pressure, the maximum concentration of hydrochloric acid at normal atmospheric pressure is thus generally 37% to 38% by weight. In the case of hydrofluoric acid, aqueous solutions containing about 48% to 70% of hydrogen fluoride are satisfactory. Hydrochloric and hydrofluoric acid are conveniently employed at their reagent grade concentration of about 37% to 38% and about 48%, respectively. The amount of acid employed may range from about 10 mols to about 600 mols of acid, preferably from about 20 to about 60 mols per mol of the BMD starting material with hydrofluoric acid and from about 30 to about 150 mols per mol of BMD with hydrochloric acid. Generally the reaction is executed at a temperature in the range of from −30° C. to about 25° C. or higher, and preferably in the area of 0° C., i.e., from about −5° C. to about 5° C. In the case of hydrochloric acid, the BMD starting material is generally insoluble in the aqueous acid, whereas the 17α,21-dihydroxy-20-keto product is soluble. Thus, a convenient means of determining the optimum reaction time when hydrochloric acid is employed is to stir the BMD derivative in aqueous hydrochloric acid until complete solution is obtained and then stir the resulting solution for 1–3 minutes, immediately thereafter quenching the reaction solution in ice water or a chilled alkaline solution. In the case of hydrofluoric acid, some BMD starting materials are themselves soluble in this reagent and, accordingly, a complete solution cannot be utilized as the sole criterion of the reaction's completeness. Thus, in the case of hydrofluoric acid, the reaction is generally stirred for a period of from about 30 minutes to three hours, even though a homogeneous solution may be observed after about 20 minutes or less.

If desired, inert, organic solvents can also be added to the reaction mixture. These are generally present in amounts ranging up to about 50% by volume, and more often from about 25% to 35% by volume, based on the total volume of the reaction mixture. Among the solvents which may thus be employed are the water-miscible ethers such as dioxane, tetrahydrofuran, tetrahydropyran, ethyleneglycol monoethyl ether acetate, diethyleneglycol monoethyl ether acetate, higher polyethylene and polypropyleneglycol ethers and ether-esters, and the like, as well as mixtures thereof.

As indicated above, the reaction mixture is quenched at the end of the reaction period by adding it to or adding to it, aqueous alkali such as alkaline carbonates or bicarbonates, hydroxides or the like. Sodium and potassium bicarbonates and carbonates are satisfactory for this purpose. The product is isolated via conventional techniques such as through extraction with organic solvents such as methylene chloride, diethyl ether, ethyl acetate and the like. Additional purification, if necessary, can be effected through recrystallization or chromatography.

Included among the BMD derivatives which are suitable as starting materials in the practice of the present invention are those compounds represented by the general formula:

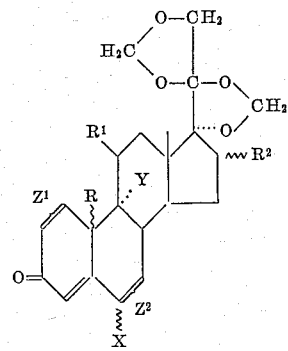

In this formula R is hydrogen or methyl; $R^1$ is hydrogen, α-hydroxy, β-hydroxy or keto; $R^2$ is hydrogen, hydroxy or methyl; X is hydrogen, methyl, fluorine or chlorine; Y is hydrogen, fluorine or chlorine, with Y being hydrogen when $R^1$ is hydrogen; each $Z^1$ and $Z^2$ is either a saturated linkage or a double bond between the carbon atoms at the 1 and 2 and 6 and 7 positions, respectively, $Z^1$ being a saturated linkage when R is hydrogen, and the symbol ∫ indicates that the substituents attached to the 6-, 10- and 16-carbon atoms can be in either the α- or the β-configuration.

Typical starting materials thus include:

17α,20;20,21-bismethylenedioxy-pregn-4-en-3-one;
17α20;20,21-bismethylenedioxy-pregn-4-en-11β-ol 3-one;
17α20;20,21-bismethylenedioxy-pregn-4-ene-3,11-dione;
17α,20;20,21-bismethylenedioxy-allopregnane-3,11-dione;
17α,20;20,21-bismethylenedioxy-pregna-1,4-dien-3-one;
17α,20;20,21-bismethylenedioxy-pregna-1,4-dien-11β-ol-3-one;
17α,20;20,21-bismethylenedioxy-pregna-1,4-diene-3,11-dione;
17α,20;20,21-bismethylenedioxy-9α-fluoropregn-4-en-11β-ol-3-one;
17α,20;20,21-bismethylenedioxy-9α-fluoropregn-4-ene-3,11-dione;
17α,20;20,21-bismethylenedioxy-6α-methylpregn-4-en-11β-ol-3-one;
17α,20;20,21-bismethylenedioxy-6α-methylpregna-1,4-dien-11β-ol-3-one;
17α,20;20,21-bismethylenedioxy-pregna-4,6-diene 3,11-dione;
17α,20;20,31-bismethylenedioxy-pregna-4,9(11)-dien-3-one;
17α,20;20,21-bismethylenedioxy-6α,9α-difluoropregna-1,4-dien-11β-ol-3-one;
17α,20;20,21-bismethylenedioxy-2',16α-dimethyl-pregna-4,6-dien-11β-ol-[3,2c]-pyrazole; and
17α,20;20,21-bismethylenedioxy-19-norpregn-4-en-11β-ol-3-one.

In order that those skilled in the art can more fully understand the present invention, the following examples are set forth. These examples are given solely for the purpose of illustrating the invention, and should not be considered as expressing limitations unless so set forth in the appended claims. All parts and percentages are by weight, unless otherwise stated.

*Example 1*

Two hundred fifty mg.[0.62 mmol (millimol)] of 17α, 20;20,21-bismethylenedioxy-pregn-4-en-11β-ol-3-one were suspended in 2.5 cc. (60 mmols) of aqueous 48% hydrofluoric acid (thus giving approximately 97 mols of hydrofluoric acid per mol of steroid starting material), maintained at 0° C. in a polyethylene reaction vessel, and the resulting reaction mixture was stirred at 0° C. for 90 minutes, it being noted that after 20 minutes all of the steroid starting material had gone into solution. Following this reaction period the reaction mixture was neutralized by the addition of aqueous 5% potassium bicarbonate solution and then extracted with ethyl acetate. The thus-obtained extracts were evaporated to dryness under reduced pressure to give a crude product (230 mg.) which was then filtered through a column containing 20 grams of silica gel, eluting with 35% ethyl acetate in hexane until all the unreacted material (38 mg.) had been eluted. Further elution with ethyl acetate gave, on selective combination of the required fractions, 124 mg. of free pregn - 4 - ene - 11β,17α,21 - triol - 3,20 - dione, which was shown to be >95% pure by thin-layer chromatography. Recrystalliation from isopropyl alcohol then gave pure hydrocortisone, M.P. 207–211° C. (corrected). The overall yield of final product, calculated on the final product obtained from the column (121 mg.) and based on reacted steroid starting material, was 64%.

*Example 2*

The procedure of Example 1 hereinabove was repeated save that the steroid starting material was added to a mixture of 2.5 cc. of aqueous 48% hydrofluoric acid and 1.2 cc. of tetrahydrofuran, which gave a single phase reaction solution immediately. The overall yield of hydrocortisone was 66%.

*Example 3*

Three hundred milligrams (0.74 mmol) of 17α,20;20, 21 - bismethylenedioxy - 4 - oxapregnan - 11β - ol - 3-one were suspended in 4 cc. (96 mmols) of aqueous 48% hydrofluoric acid (thus giving approximately 130 mols of hydrofluoric acid per mol of steroid starting material), maintained at 0° C. in a polyethylene reaction vessel, and the resulting reaction mixture was stirred at 0° C. for 70 minutes. Following this reaction period, the reaction mixture was neutralized by the addition of aqueous 5% potassium bicarbonate solution and then extracted with n-butanol. The thus-obtained extract was evaporated to dryness under reduced pressure and then recrystallized from methyl acetate:chloroform to give analytically pure 4 - oxapregnane - 11β,17α,21 - triol - 3,20 - dione, M.P. 237–240° C. The overall yield of final product was 44%.

*Example 4*

One gram (2.56 mmols) of 17α,20;20,21-bismethylenedioxy-19-nor-9β,10α-pregn-4-en-3-one was suspended in 2.5 cc. of aqueous 48% hydrofluoric acid (thus giving approximately 23 mols of hydrofluoric acid per mol of steroid starting material); maintained at 0° C. in a polyethylene reaction vessel, and the resulting reaction mixture was stirred at 0° C. for 94 minutes, it being noted that after 4 minutes all of the steroid starting material had dissolved to give a clear, pale yellow solution. Following this reaction period the reaction mixture was neutralized by the addition of aqueous 5% potassium bicarbonate solution and then extracted with ethyl acetate. The thus-obtained extract was evaporated to dryness under reduced pressure to give a crude product (970 mg.) which was then recrystallized from ethyl acetate to give 527 mg. of 19-nor-9β,10α-pregn-4-ene-17α,21-diol-3,20 - dione, M.P. 187–192° C. Recrystallization of the mother liquors gave an additional crop of 129 mg. of final product, M.P. 186–192° C. The overall yield of final product was 73%.

In constrast to this, hydrolysis of 17α,20;20,21-bismethylenedioxy-19-nor-9β,10α-pregn-4-en-3-one using aqueous 90% formic acid at reflux temperature for 3 minutes gave an overall yield of 19-nor-9β,10α-pregn-4-ene-17α,21-diol-3,20-dione 21 formate of 12%.

*Example 5*

One gram (2.28 mmols) of 6α,9α-difluoro-17α,20;20,21- bismethylenedioxy-pregna-1,4-dien-11β-ol-3-one was suspended in 10 cc. (0.35 mol) of aqueous 70% hydrofluoric acid (thus giving approximately 154 mols of hydrofluoric acid per mol of steroid starting material), maintained at −20° C. in a polyethylene reaction vessel, and the resulting reaction mixture was stirred at −20° C. for 2.5 hours. Following this reaction period the reaction mixture was slowly poured into water, and potassium carbonate was then added in portions until the solution became slightly alkaline, at which point the product precipitated. This precipitate was collected by filtration, washed with water until neutral and dried, thus giving 6α,9α-difluoropregna-1,4-diene-11β,17α,21-triol-3,20-dione.

*Example 6*

To 300 cc. of 36.7% hydrochloric acid, cooled to 0° C., were added 10 g. of 17α,20;20,21-bismethylenedioxy-2-formylpregna-1,4-dien-11β-ol-3-one. This suspension was stirred vigorously until the starting material was completely dissolved, a period of about 2 minutes. The solution was stirred for one additional minute at the same temperature and then poured into a solution of 260 g. of sodium bicarbonate in 1.5 liters of water. This mixture was extracted three times with 200 cc. of ethyl acetate, and the combined extracts were washed with water to neutrality, dried over anhydrous sodium sulfate and evaporated to dryness in vacuo. The residue was dissolved in 300 cc. of 40:60 ethyl acetate:hexane and chromatographed on 300 g. of silica gel. Upon elution with 50:50 ethyl acetate:hexane, there were obtained 7.35 g. of 2-formyl-pregna-1,4-diene-11β,17α,21-triol-3,20-dione, M.P. 254–255° C.; $[\alpha]_D +47°$ (dioxane); (81.5% yield).

*Example 7*

The procedure of Example 6 was repeated using, however, 30% hydrochloric acid. Upon completion of the steps therein described, the identical product was obtained in a yield of 70%.

*Example 8*

To 15 cc. of 36.7% concentrated hydrochloric acid, cooled to −10° C., were added 400 mg. of 17α,20;20,21-bismethylenedioxy-6α-fluoropregn - 4 - ene-11β-ol-3-one. This suspension was stirred until the steroid was completely dissolved (about 5 minutes) and then stirred for one additional minute. At the end of this time, the reaction mixture was poured into 100 cc. of 25% sodium bicarbonate solution. This mixture was extracted with methylene chloride, and the combined extracts were washed with water to neutrality, dried over sodium sulfate, and evaporated to dryness in vacuo. The residue was recrystallized from acetone:hexane to give a yield of 320 mg. of 6α-fluoropregn-4-ene-11β,17α,21-triol-3,20-dione.

*Example 9*

To one liter of 37.6% concentrated hydrochloric acid were added 100 g. of the bismethylenedioxy derivative of cortisone. The suspension was stirred vigorously at 0–5° C. until the steroid was dissolved (about 10 minutes), and then stirred for an additional 2 minutes. The reaction mixture was poured immediately into ice water, and this mixture was extracted with ethyl acetate. These extracts were washed with water, 5% aqueous sodium bicarbonate solution, and again with water until the washings were neutral, and then dried and evaporated to dryness. The residue was recrystatllized from methylene chloride:hexane to yield 74.0 g. of cortisone, M.P. 220–224° C. (dec.).

What is claimed is:

1. The process for hydrolyzing 17α,20;20,21-bismethylenedioxy steroid of the pregnane series so as to produce a 17α,21-dihydroxy-20-keto steroid of the pregnane series which comprises treating the 17α,20;20,21-bismethylenedioxy steroid with at least a ten-fold molar excess of an aqueous solution of at least 20% by weight of either hydrogen fluoride or hydrogen chloride at a temperature from about −30° C. to about 25° C.

2. The process according to claim 1 wherein the 17α,20;20,21-bismethylenedioxy steroid is treated with from about a twenty-fold to about a sixty-fold molar excess of an aqueous solution of from about 48% to about 70% by weight of hydrogen fluoride.

3. The process according to claim 2 wherein the treatment is conducted at a temperature of from about −5° C. to about 5° C.

4. The process according to claim 1 wherein the 17α,20;20,21-bismethylenedioxy steroid is treated with from about a twenty-fold to about a sixty-fold molar excess of an aqueous solution of about 48% by weight of hydrogen fluoride at a temperature of from about −5° C. to about 5° C.

5. The process according to claim 4 wherein the treatment is conducted in the presence of a water-miscible ether.

6. The process according to claim 1 wherein the 17α,20;20,21-bismethylenedioxy steroid is treated with from about a thirty-fold to about a one hundred fifty-fold molar excess of an aqueous solution of from about 20% to about 38% by weight of hydrogen chloride.

7. The process according to claim 6 wherein the treatment is conducted at a temperature of from about −5° C. to about 5° C.

8. The process according to claim 1 wherein the 17α,20;20,21-bismethylenedioxy steroid is treated with from a fifty-fold to about a one hundred-fold molar excess of an aqueous solution of about 38% by weight of hydrogen chloride at a temperature of from about −5° C. to about 5° C.

No references cited.

LEWIS GOTTS, *Primary Examiner.*

ELBERT L. ROBERTS, *Examiner.*